United States Patent [19]
Leisenberg

[11] 3,888,470
[45] June 10, 1975

[54] METHOD AND APPARATUS FOR AUTOMATICALLY REGULATING THE PLASTICITY OF CERAMIC MATERIAL

[75] Inventor: Wolfgang Leisenberg, Lich/Hesse, Germany

[73] Assignee: Manfred Leisenberg KG Industrifeuerungen, Germany

[22] Filed: Apr. 8, 1974

[21] Appl. No.: 459,009

[30] Foreign Application Priority Data
May 26, 1973 Germany.......................... 2326969

[52] U.S. Cl................................ 259/191; 425/145
[51] Int. Cl............................................... B29b 1/06
[58] Field of Search ......... 259/191, 192, 193, 5, 6, 259/21, 40, 41, 64, 9, 10, 97; 425/145, 205

[56] References Cited
UNITED STATES PATENTS

| | | | |
|---|---|---|---|
| 3,693,946 | 9/1972 | Merritt.............................. | 259/191 |
| 3,733,059 | 5/1973 | Pettit................................. | 259/191 |
| 3,755,516 | 8/1973 | Bonikowski...................... | 425/145 |
| 3,822,867 | 7/1974 | Evans................................ | 259/191 |
| 3,831,616 | 8/1974 | Weyers.............................. | 425/145 |

*Primary Examiner*—Robert W. Jenkins
*Attorney, Agent, or Firm*—Hill, Gross, Simpson, Van Santen, Steadman, Chiara & Simpson

[57] ABSTRACT

A method and apparatus for automatically regulating the plasticity of ceramic material by means of addition of water, vapor (or steam) or dry substances to the mixer of a production chain which includes a mixer and an extrusion press. The plasticity of the material in the pressing head of the extruder and the power consumption of the mixer are measured and provided as regulating signals to a cascade regulator. The cascade regulator includes a primary regulator and an auxiliary regulator which are preferably equipped with constant regulators. The regulator associated with the primary regulator system includes an integrating portion and an output signal from the cascade regulating system is utilized for controlling a dosing device for a dosage type addition of water, steam or dry substances to the mixer.

14 Claims, 3 Drawing Figures

METHOD AND APPARATUS FOR AUTOMATICALLY REGULATING THE PLASTICITY OF CERAMIC MATERIAL

BACKGROUND OF THE INVENTION

1. Field of the Invention

This invention relates to a method and apparatus for automatically regulating the plasticity of ceramic material, and more particularly to a method and apparatus for performing automatic regulation in a simple and economic manner.

2. Description of the Prior Art

In the plastic deformation of ceramic raw materials in extrusion presses, a determined moisture content of the mass is necessary and must be automatically maintained constant to a high degree of accuracy in order to provide a quality product and because of the lack of suitable operating personnel.

For a continuous monitoring of the moisture content of the clay, two methods have heretofore been employed.

A first of these methods for the direct and indirect measurement of moisture content includes the utilization of nuclear methods according to the neutron degradation method, and an optical method utilizing infrared reflection measuring can be carried out. the disadvantage of this method lies in the fact that only in a few cases are suitable measuring prerequisites present without greater changes in the preparation facility, and the high cost in providing the apparatus for performing such measurements.

Secondly, in many cases the great dependency of the plastic characteristics of ceramic raw materials on the water content thereof is utilized. As measurable evidence as to the plasticity, two values are utilized. First of all, the power required by mixing machines is greatly dependent on the plastic behavior of the raw material. Therefore, this has long been used as a regulating value in plasticity control systems. The technical regulating advantage lies in the short dead or delay time between engagement and consequence of the result of the measurement. The disadvantage lies in the fact that, in addition to the plasticity of the clay, also the instantaneous through-put capacity, the degree of filling of the mixing machine and its condition of wear enter into the result. The output therefore only has a limited value.

A pure measurement of the plasticity, to the contrary, is revealed by measuring the pressing pressure, which is to a great extent independent of the fluctuations in the through-put capacity. In any case, the time between engagement and consequence of a measurement of pressing pressure if sufficiently long than a good regulating result is not possible.

On the basis of the extrusion pressure, in all cases coming into question, the possibility further measuring the plasticity through the pressing pressure is available. Furthermore, in many cases, suitable measuring implements are available which permit measurement of the plasticity of the web beyond the mouthpiece of the extruder. In almost all cases, a mixing assembly is placed in front of the extrusion press, which mixer is driven by a separate motor. Therefore, as a ffurther possibility for measuring the plasticity at an earlier point in time, the measurement of the power required by the mixer is available.

SUMMARY OF THE INVENTION

It is therefore the object of the invention to provide a regulating method and apparatus by means of which the plasticity of raw ceramic material may be automatically regulated.

In this connection, the necessary investment expense is to be minimized, whereby the measurement possibilities indicated by the molding installation in the coarse ceramic industry are to be utilized. Above all, however, in order to overcome the disadvantages of known methods, an accurate and rapid regulation is provided through the use of both measurement parameters available, which parameters are easily ascertained at a relatively low cost.

In accordance with the invention, this is accomplished in that through the addition of water, steam (or vapor) or dry substances to the mixer of a production chain comprising a mixer and an extrusion press, the plasticity of the mass in the pressing head of the extruder or in the extruded web, as well as the through-put capacity of the mixer are measured. These magnitudes are supplied as guide magnitudes, as well as auxiliary magnitudes to a cascade regulation system comprising a primary control system and an auxiliary control system which are each advantageously equipped with constant regulators. The regulator correlated with the primary control system includes an integral portion and the output signal of the cascade system is utilized to control a dosing device for the dosaged addition of water, vapor (or steam) or drying substances to the mixer.

The plasticity of the material therefore determines an accurate primary regulating magnitude and the power consumption of the mixing motor serves as a rapid auxiliary regulating magnitude. In this manner, the method of the present invention provides for superior regulation without essential increased expenditures both for a regulation of the power consumption alone, with respect to accuracy, and to the regulation of the plasticity alone, with respect to a rapid reaction.

Furthermore, it is highly advantageous in or during interruptions in the course of production to store both control magnitudes, converted into analogous direct voltages, in the integral portion of the regulator or control correlated with the primary regulating system. This is made possible in that for the holding of the measured values there is provided for each of the regulators an operational amplifier whose feedback circuit comprises a parallel or shunt connection which determines the time constants by means of a resistance and a capacitor. The capacitor, upon interruption of the course of production, for example, by means of a relay, is separated from the feedback connection. Furthermore, the integral portion of the regulator may be formed with an operational amplifier having a feedback path which includes a capacitor which, upon interruption of the course of production, is separated by means of a relay from the feedback circuit.

For the dosing of water and steam or vapor, one or more electronically controllable magnetic valves are employed and are driven with a constant opening frequency and variable control of the duration of opening. It is of advantage for the control of the valves and/or of a direct current motor correlated with the dosing device, to provide a sawtooth generator, a comparator for comparing the control voltage with the sawtooth voltage, a diode and an output or power amplifier through whose interconnection as a control signal a pulse type direct voltage of constant pulse frequency is produced, the width of the pulses being dependent on the control voltage.

In order to measure the power consumption of the mixer, a current transformer is provided. In order to measure the actual plasticity at the pressure head, a manometer controlled variable resistance having an electrical tap is provided.

BRIEF DESCRIPTION OF THE DRAWINGS

Other objects, features and advantages of the invention, its organization, construction and operation will be best understood from the following detailed description of a preferred embodiment of the invention, taken in conjunction with the accompanying drawings, on which.

DESCRIPTION OF THE PREFERRED EMBODIMENT

Figure 1:
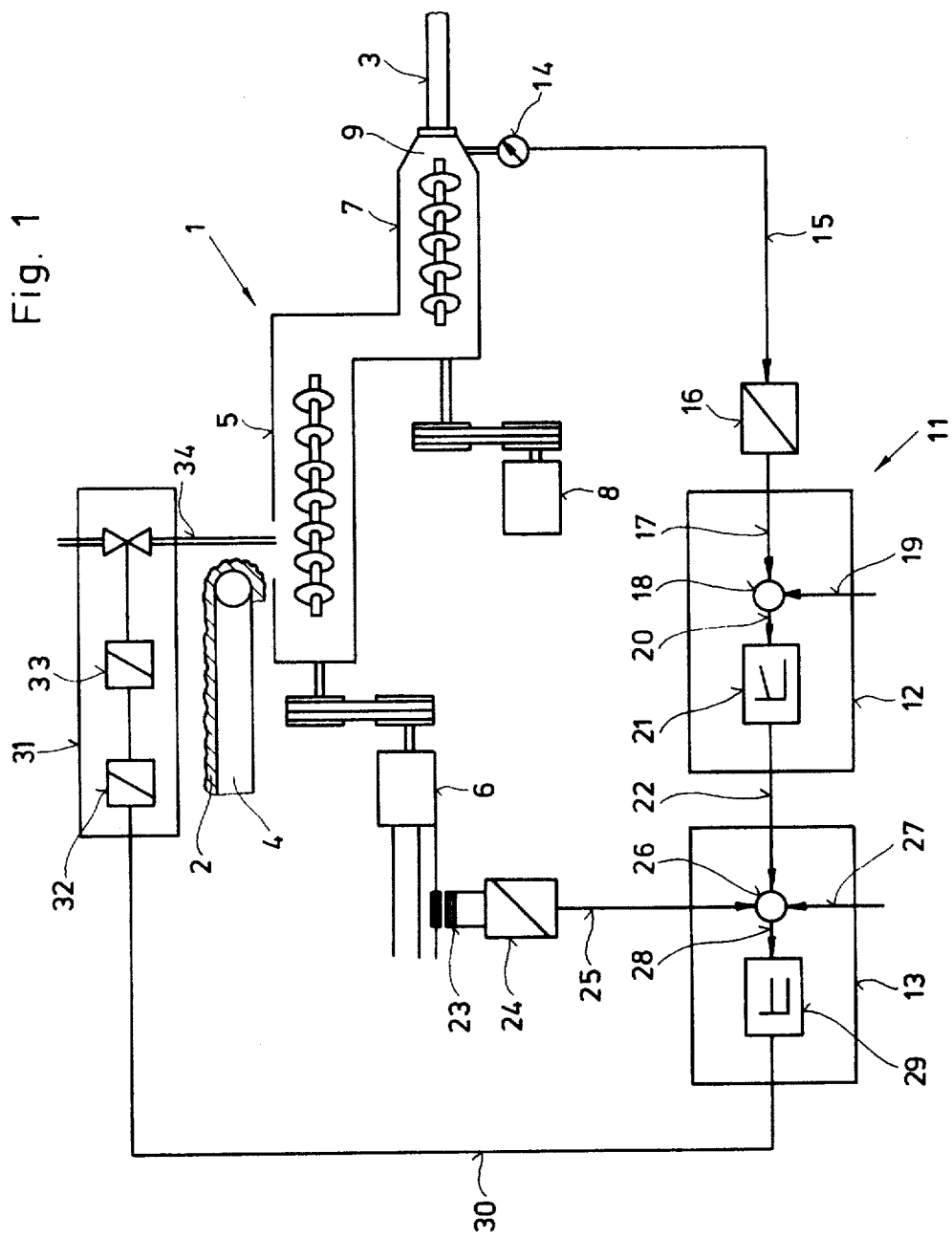
FIG. 1 is a schematic diagram of a regulatible production chain comprising a mixer and an extrusion press.

Referring to FIG. 1, a production chain for extruding raw ceramic material is generally illustrated at 1 as comprising a mixer 5 which is supplied with clay 2 by means of conveyor belt 4. The mixer 5 feeds an extrusion press 7 which extrudes a web 3 at a pressure head 9.

As is readily apparent from the drawing, the mixer 5 and the extrusion press 7 are separately driven by individual electric motors 6 and 8, respectively, which are connected to the mixer and extrusion press by suitable transmission means.

In order to influence the moisture content of the clay 2 in the mixer 5, a regulating system 11 is provided which essentially comprises a primary regulating system 12 and an auxiliary regulating system 13, connected together in a cascade system, and a dosing device 31. In this connection, the plasticity of the web 3 or the pressing pressure of the extrusion press 7 in the pressure head 9, as well as the power consumption of the driving motor 6 in the mixer 5, is measured and the regulating magnitudes determined are supplied to the primary regulating system 12 or to the auxiliary regulating system 13 which controls the dosing device 31.

The clay 2 supplied by means of the conveyor belt 4 causes more or less power consumption of the driving motor 6 of the mixer 5, the power consumption being dependent on the moisture content of the clay. The power consumption is measured, for example, through a current or series transformer 23, which measurement is converted by means of an alternating current converter 24 into a proportional direct current voltage. This voltage is supplied as an auxiliary regulating magnitude 25 to a comparator 26 of the auxiliary regulating system 13.

An adjustable theoretical value 27 for the power consumption of the mixer motor 6 is also fed to the comparator 26 to derive a control signal 28 from the deviation therebetween, which control signal 28 is supplied to the constant regulator 29 which has a P characteristic as will be understood from the description below.

The regulator 29 provides an output signal 30 which is fed to the dosing device 31 which, for example, comprises a magnet valve 33 having a controllable duration of opening, and the pertaining electronic control 32 in the form of a direct voltage pulse transformer, and each according to demand furnishes water or steam through the conduit 34. In the case of excessive moisture in the raw material, the addition of drying substances is analogously possible.

Because of its small or low dead time or dead period lag, this auxiliary regulating system 13 may also equalize sudden changes in the mositure content of the material. In any case, the theoretical value 27 of the regulator 29 requires a correction in order to compensate for varying through puts of power, wear conditions and degrees of filling of the mixer 5, which could cause errors in the measured value 25.

This takes place through the superimposed primary regulating system 12 which comprises a plasticity measuring device 14, for example, in the form of a manometer with a potentiometer tap and an adapted building block 16 which may be a resistance voltage transformer to which is supplied the output signal 15 of the measuring device 14. The primary regulator 21, as will be understood below, is suitably provided with a PI characteristic. The regulator 21 is fed with a signal 20 derived from a comparator 18 which compares a theoretical plasticity value 19 and the actual plasticity value 17 fed as an output signal of the circuit 16. The regulator 21 provides an output signal 22 and introduces the same into the auxiliary regulating system 13 to compensate for the erroneous measurements which may be obtained concerning the power consumption of the mixer 5 as set forth above, such as wear conditions through put and degrees of spilling of the mixer.

The function of the regulating system 11 accordingly rests on the technical regulation of bridging of the dead time between engagement of an intended change of moisture content at the conduit 34 and the plasticity measured through interpolation of an auxiliary regulating magnitude 25 with low or small dead time between engagement and effect of the measurement. Through the arrangement of auxiliary and primary regulating systems 13 and 12, respectively, in the form of a cascade regulating system, both the low dead time of the power measurement as well as the accuracy of the plasticity measurement is utilized, and consequently therewith the best possible regulating result is provided upon utilization of both of these measurement parameters.

Because of the pressing pressure fluctuations present for short periods, particularly with worm presses, and the likewise periodical fluctuations in current consumption of the mixing motor 6, a delay of the measured signals in necessary, which on account of the small frequency of the disturbances must have a relatively large time constant. Because the relatively frequently occurring short interruptions based on disturbances in the subsequent automatic transporation equipment, frequently starting steps of the regulating or control installation are necessary. Because of the large time constants of the measuring values during the starting step, too small a power value or plasticity value, respectively, is simulated which causes a corresponding throttling of the supply of water and under unfavorable conditions may lead to a fixation of the press. Correspondingly, upon utilization of regulators with integral portions, this starting step leads to a swinging over to the opposite direction of control, hunting so to speak, so that with each starting step, first too little and subsequently too much water is added.

Figure 2:
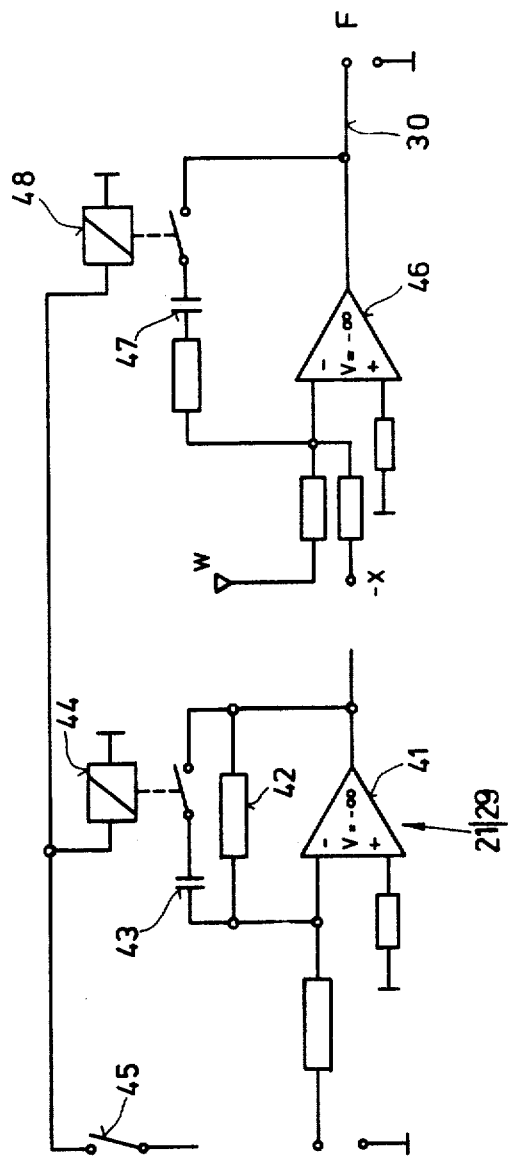
FIG. 2 is a schematic circuit diagram illustrating the regulating apparatus employed in the present invention.

This disadvantageous behavior may be prevented for example, by means of the electronic measuring value delay of the PI characteristic of the regulator 21, and, if need be, also of the regulator 29, insofar as the latter is connected corresponding to the circuit illustrated in FIG. 2.

In FIG. 2, the delay of the measured value upon interruption of the course of production is provided for the primary regulator 21, or for the auxiliary regulator 29. Each of these regulators include an operational amplifier 41 whose feedback path comprises a parallel or shunt connection of a resistor 42 determining the time constant and a capacitor 43, the capacitor 43 being separated from this connection by means of a relay 44 upon the interruption of the course of production, symbolically illustrated by the switch 45. In addition, the integral portion of the primary regulator 21 is constructed with an operational amplifier having a feedback path which includes a capacitor 47 connected in series with a contact of a relay 48 which breaks the connections upon the interruption of production.

During the short interruption, the contact 45 is opened and thereupon likewise the contacts of the relays 44 and 48. In this manner, during the interruption, the charges of the capacitors 43 and 47 are stored. The time constant of the measured value delay, which is determined by means of the capacitor 43 and the resistor 42, accordingly, is not effective in the case of short interruptions as the moisture content does not change during such interruption. Accordingly, upon restarting of production, immediately the previously existing control value is set. The same holds true also for the integral portion of the regulator 21, which is formed by means of the capacitor 47. The installation therefore operates after a short interruption with the same performance immediately prior to the interruption without a build-up process to the old operating point.

A further characteristic of the moisture regulation in the ceramic industry is of necessity of having to add water, steam or drying substances. For the dosing of water, for a constant regulation, rotary pumps controlled by the rate of revolution or controllable valves are generally applied, and for steam dosing, likewise valves are conventionally utilized. Dry substances are normally added by means of motor driven dosing devices.

As a method for dosing with valves, the "pulse method" is utilized in which magnet valves may be employed with only two conditions (open-closed). The control of the added quantity takes place in such a manner that the valve is opened at constant time spacings (periodically) and the duration of opening, however, may be altered electronically between 0 and 100% of the period. Through adjustment of a sufficiently high opening frequency, which is large with respect to the time constants of the regulating system, a constant regulating behavior is attained with slight expenditure. The utilization of this method permits, in addition, the control with only one electronic building block for both direct current motor applications (pumps, dry substance dosing) and electromagnetic valves.

Figure 3:
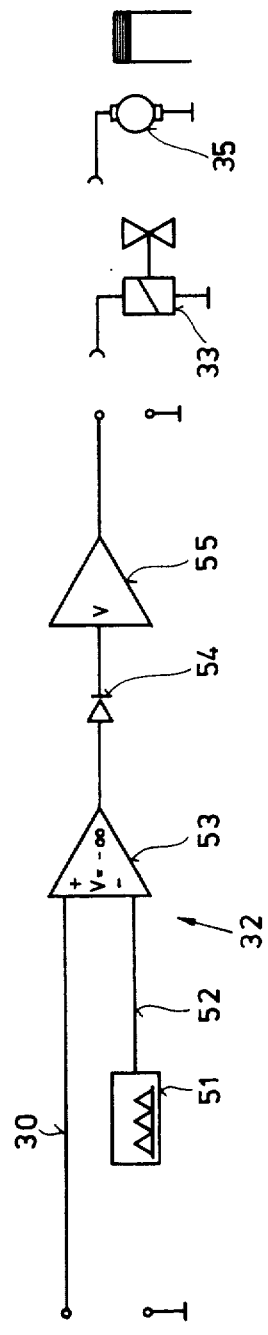
FIG. 3 is a schematic circuit diagram of the dosing control circuit operated by the regulating system.

This building block structure is illustrated in FIG. 3. It comprises a sawtooth generator 31, a voltage comparator 53, and a power amplifier 55, a diode being connected between the output of the voltage comparator 53 and the power amplifier 55. The control voltage as an output signal 30 of the auxiliary regulator 29 is compared with the sawtooth voltage 52 at the comparator 53. As long as the sawtooth voltage 52 is smaller than the control voltage 30, a positive voltage is provided at the output of the comparator 53, while at all other times a negative voltage is effective at the output. The positive pulses are amplified in the power amplifier 55 and made available as an output signal to control electromagnetic valves or direct current motors.

The greater the control voltage, the greater also is the pulse width of the output signal and, accordingly, the relative duration of opening. If there is a low value of approximately 2 Hz selected for the sawtooth frequency, the drive of a direct current motor 35 is possible, as the average value of the armature voltage is proportional to the relative duration of opening. As a result, all dosing aggregates coming into question permit of being driven with only one building block structure. As illustrated in FIG. 3, an electromagnetic valve actuator 33 or a direct current motor 35 may be driven by the output signal of the power amplifier 55.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of controlling the plasticity of ceramic material in a production chain in which a mixer is fed raw material and feeds an extrusion press having an extrusion head, the mixer and the extrusion press being driven by respective prime movers, comprising the steps of:

generating a first signal indicative of the power consumption of the mixer prime mover;

generating a second signal indicative of the plasticity at the extrusion head;

comparing the second signal with a reference, third signal, representing desired plasticity, to obtain a correction signal;

combining the first and correction signals to obtain a corrected first signal;

comparing the corrected first signal with a reference fourth signal, representing desired power consumption, to obtain a fifth signal; and adding moisture controlling substances to the mixer in accordance with the magnitude of the fifth signal.

2. The method set forth in claim 1, comprising the step of:

storing said correction signal and said fifth signal upon interruption of the extrusion process for immediate reapplication upon resumption of the process.

3. The method set forth in claim 2, comprising the step of:

delaying changes in said correction signal and in said fifth signal to prevent over-compensation of moisture content in response to short disturbances in the extrusion process.

4. In a production chain of the type in which ceramic material is extruded from an extrusion head of an extrusion press fed by a mixer which is in turn fed raw material by a conveyor and moisture controlling substances by a control system including a controlled mechanism under the control of a control circuit, the mixer being driven by an electric motor, the improvement wherein said control system comprises:

power consumption detection means connected to the electric motor, including first signal generating means for producing a first signal indicative of mixer power consumption as a course measurement of plasticity;

plasticity detection means for detecting the plasticity of the material at the extrusion head, including second signal generating means for producing a second signal indicative of actual plasticity; and moisture control means connected to said power consumption detection means, to said plasticity detection means and to the controlled mechanism for operating the controlled mechanism in response to said first and second signals.

5. The improvement set forth in claim 4, wherein said power consumption detection means includes a transformer having a primary winding connected in series with one of the electric motor supply lines and a secondary, and a converter connected to said secondary for providing said first signal.

6. The improvement set forth in claim 4, wherein said plasticity detection means comprises a manometer connected to said extrusion head and a potentiometer with a movable tap connected to said manometer.

7. The improvement set forth in claim 4, wherein said moisture control means comprises:

first and second cascade connected regulating means, said first regulating means including means for comparing said second signal with a reference signal representing desired plasticity to produce a correction signal, said second regulating means connected to said controlled mechanism, including means for combining said first and correction signals to obtain a corrected first signal and means for comparing the corrected first signal with a reference signal representing desired power consumption to produce a moisture control signal for controlling the operation of the controlled mechanism.

8. The improvement set forth in claim 7, wherein each of said regulating means comprises signal storage means operable in response to an interruption of production to store their respective signals until production is restarted.

9. The improvement set forth in claim 7, wherein each of said regulating means comprises an operational amplifier including a feedback path comprising a parallel connected resistor and capacitor, and relay means having a contact connected to said capacitor and operated to disconnect said capacitor in response to and during an interruption in production.

10. The improvement set forth in claim 7, wherein said first regulating means includes an integrator comprising an operational amplifier, a capacitor connected in a feedback path of said operational amplifier, and switch means connected in the feedback path and operable in response to an interruption of production to disconnect said capacitor.

11. The improvement set forth in claim 7, wherein the controllable mechanism includes at least one electromagnetic valve interposed between a fluid supply and the mixer, means for periodically opening said valve and means for controlling the duration of valve opening.

12. The improvement set forth in claim 7, comprising at least one dosing component interposed between a supply of moisture controlling substance, a source of sawtooth voltage, a comparator connected to said source of sawtooth voltage and to said second regulating means and responsive to provide a first output signal when said moisture control signal is greater than the sawtooth voltage, a power amplifier, a diode connecting the output of said comparator to the input of said power amplifier, said dosing component connected to the output of said power amplifier.

13. The improvement set forth in claim 12, wherein said dosing component includes an electromagnetic valve.

14. The improvement set forth in claim 12, wherein said dosing component includes a d.c. motor.

* * * * *